(12) United States Patent
Dorian

(10) Patent No.: US 12,195,377 B2
(45) Date of Patent: Jan. 14, 2025

(54) PROCESSES AND APPARATUS FOR REDUCING CONCENTRATION OF PFAS CONTAMINATION IN WASTEWATER AND/OR SOIL

(71) Applicant: EGL WATER PTY LTD, Notting Hill (AU)

(72) Inventor: Brian Dorian, Notting Hill (AU)

(73) Assignee: EGL WATER PTY LTD, Notting Hill (AU)

(*) Notice: Subject to any disclaimer, the term of this patent is extended or adjusted under 35 U.S.C. 154(b) by 493 days.

(21) Appl. No.: 17/763,056

(22) PCT Filed: Nov. 26, 2021

(86) PCT No.: PCT/AU2021/051411
§ 371 (c)(1),
(2) Date: Mar. 23, 2022

(87) PCT Pub. No.: WO2022/109676
PCT Pub. Date: Jun. 2, 2022

(65) Prior Publication Data
US 2023/0058206 A1    Feb. 23, 2023

(30) Foreign Application Priority Data
Nov. 27, 2020   (AU) .............................. 2020904403

(51) Int. Cl.
*C02F 9/00*   (2023.01)
*B09C 1/08*   (2006.01)
(Continued)

(52) U.S. Cl.
CPC ................. *C02F 9/00* (2013.01); *B09C 1/08* (2013.01); *C02F 1/24* (2013.01); *C02F 1/32* (2013.01);
(Continued)

(58) Field of Classification Search
CPC ...... C02F 9/00; C02F 1/24; C02F 1/32; C02F 1/66; C02F 1/78; C02F 2101/36;
(Continued)

(56) References Cited

U.S. PATENT DOCUMENTS 7,156,984 B2    1/2007  Kerfoot
2018/0116971 A1   5/2018  Tachibana
(Continued)

FOREIGN PATENT DOCUMENTS

CN    101070204 A    11/2007
CN    110342728 A    10/2019
(Continued)

OTHER PUBLICATIONS

International Search Report & Written Opinion dated Feb. 18, 2022 from corresponding PCT Application No. PCT/AU2021/051411.
(Continued)

*Primary Examiner* — Madeline Gonzalez
(74) *Attorney, Agent, or Firm* — INNOVATION CAPITAL LAW GROUP, LLP; Vic Lin

(57) ABSTRACT

A process for PFAS decontamination comprises exposing water comprising PFAS contaminant to gas to accumulate a PFAS concentrate and separating the PFAS concentrate. PFAS separation is enhanced by the addition of a hydrofluorocarbon refrigerant, such as 1,1,1,2 tetraflouroethane, difluoromethane or pentaflouroethane to the gas wherein it is believed that with carbon-fluorine bonds of the hydrofluorocarbon refrigerant aid in attracting the carbon fluorine tail of all types of PFAS compounds to the water-gas interface and especially aids separation of smaller molecular weight PFAS molecules, including beyond what can be achieved using charged or ionised gases alone, thereby allowing a larger spectrum of PFAS molecules to be extracted from soil or water.

25 Claims, 5 Drawing Sheets

(51) Int. Cl.
*C02F 1/24* (2023.01)
*C02F 1/32* (2023.01)
*C02F 1/66* (2023.01)
*C02F 1/78* (2023.01)
*C02F 101/36* (2006.01)

(52) U.S. Cl.
CPC ........ *C02F 1/66* (2013.01); *C02F 1/78* (2013.01); *C02F 2101/36* (2013.01); *C02F 2303/185* (2013.01)

(58) Field of Classification Search
CPC ............ C02F 2303/185; C02F 2209/38; C02F 2209/42; C02F 2305/023; C02F 1/583; C02F 1/76; C02F 2101/14; B09C 1/08; B09C 1/00; B09C 1/02
USPC .................................................. 210/702–706
See application file for complete search history.

(56) References Cited

U.S. PATENT DOCUMENTS

| | | |
|---|---|---|
| 2019/0176101 A1 | 6/2019 | Phillips et al. |
| 2019/0210900 A1 | 7/2019 | Ball et al. |
| 2019/0241452 A1 | 8/2019 | Ball |
| 2019/0300387 A1* | 10/2019 | Nelson ............. B03D 1/24 |

FOREIGN PATENT DOCUMENTS

| | | |
|---|---|---|
| EP | 3233229 A1 | 10/2017 |
| EP | 3738674 A1 | 11/2020 |
| JP | 2020203270 A | 12/2020 |
| WO | 2002094723 A1 | 11/2002 |
| WO | 2014138062 A1 | 9/2014 |
| WO | 2017131972 A1 | 8/2017 |
| WO | 2017210752 A1 | 12/2017 |
| WO | 2017218335 A1 | 12/2017 |
| WO | 2018101251 A1 | 6/2018 |
| WO | 2019111238 A1 | 6/2019 |
| WO | 2019113268 A1 | 6/2019 |
| WO | 2020260487 A1 | 12/2020 |
| WO | 2021042175 A1 | 3/2021 |
| WO | 2021188493 A1 | 9/2021 |
| WO | 2022043829 A1 | 3/2022 |

OTHER PUBLICATIONS

Brusseau, ."The influence of molecular structure on the adsorption of PFAS to fluid-fluid interfaces: Using QSPR to predict interfacial adsorption coefficients" Water Research, 152, 148-158 (2019).
Brusseau, et al, "The influence of surfactant and solution composition on PFAS adsorption at fluid-fluid interfaces." Water Research, 161, 17-26 (2019).
Burns et al., "PFAS removal from groundwaters using Surface-Active Foam Fractionation" Remediation, 31 (4) (2021), pp. 19-33, Publication Date: Aug. 24, 2021.
Ebersbach et al., "An alternative treatment method for fluorosurfactant-containing wastewater by aerosol-mediated separation" Water Res., 101 (2016), pp. 333-340.
Gallen et al. "Australia-wide assessment of perfluoroalkyl substances (PFAS) in landfill leachates" J. Hazard Mater., 331 (2017), pp. 132-141.
Hu et al., "Detection of poly- and perfluoroalkyl substances (PFASs) in U.S. Drinking water linked to industrial sites, military fire training areas, and wastewater treatment plants" Environ. Sci. Technol. Lett., 3 (10) (2016), pp. 344-350.
Lee et al, ,"Recovery of perfluorooctane sulfonate (PFOS) and perfluorooctanoate (PFOA) from dilute water solution by foam flotation", Separation and Purification Technology, vol. 173, (2017), pp. 280-285, ISSN 1383-5866.
Li et al., "Perfluorooctanoic acid (PFOA) removal by flotation with cationic surfactants" Chemosphere, 266 (2021), 9 pages, Article 128949.
Liu et al., "Surfactant-enhanced remediation of oil-contaminated soil and groundwater: a review" Sci. Total Environ., 756 (2021), pp. 1-19.
Lunkenheimer et al., "Adsorption properties of surface chemically pure sodium perfluoro-n-alkanoates at the air/water interface: counter ion effects within homologous series of 1:1 ionic surfactants" Langmuir, 31 (3) (2015), pp. 970-981 Publication Date: Dec. 24, 2014.
Martin et al., "Foam fractionation with reflux" Chem. Eng. Sci., 65 (12) (2010), pp. 3825-3835.
McCleaf et al., "Foam fractionation removal of multiple per- and polyfluoroalkyl substances from landfill leachate" AWWA Water Sci., 3 (5) (2021), p. e1238, 1-19, Publication Date: Sep. 12, 2021.
Meng et al., "Efficient removal of perfluorooctane sulfonate from aqueous film-forming foam solution by aeration-foam collection" Chemosphere, 203 (2018), pp. 263-270.
Robey et al., "Concentrating per- and polyfluoroalkyl substances (PFAS) in municipal solid waste landfill leachate using foam separation" Environ. Sci. Technol., 54 (19) (2020), pp. 12550-12559 Publication Date: Aug. 31, 2020 https://doi.org/10.1021/acs.est.0c01266.
Silva et al., "Evaluating air-water and NAPL-water interfacial adsorption and retention of Perfluoro carboxylic acids within the Vadose zone" J. Contam. Hydrol., 223 (2019), Article 103472.
Stevenson et al."Modelling continuous foam fractionation with reflux" Chem. Eng. Proc.: Pro. Intens., 46 (12) (2007), pp. 1286-1291.
Vilaseca et al, "Phase equilibria, surface tensions and heat capacities of hydrofluorocarbons and their mixtures including the critical region" The Journal of Supercritical Fluids, vol. 55, Issue 2, 2010, pp. 755-768.

* cited by examiner

PROCESSES AND APPARATUS FOR REDUCING CONCENTRATION OF PFAS CONTAMINATION IN WASTEWATER AND/OR SOIL

FIELD OF THE INVENTION

This invention relates generally to processes and apparatus for reducing concentration of PFAS contamination in wastewater and/or soil.

BACKGROUND OF THE INVENTION

Per- and poly-fluoroalkyl substances (PFAS) are man-made chemicals that have been widely used for decades in the manufacture of household and industrial products such as waterproof and fire-resistant fabrics, cookware, food packaging and insecticides. PFAS were extensively used in firefighting froth due to its heat-resistant properties until its detrimental effects on the ecosystem were detected and its use terminated in 2015.

These toxic chemicals do not easily break down and have found their way into the natural environment.

The most well-known PFAS are PFOS, PFOA and PFHxS. These three PFAS are part of a broader group of PFAS known as PFAAs, which resist physical, chemical, and biological degradation, and are very stable. This stability creates a problem as these PFAS last for a long time. A wide range of other PFAS, known as precursors, can transform into PFAAs in products in the environment, and are also considered environmentally detrimental.

A need exists for a way to reduce the concentration of PFAS compounds in contaminated water and/or soil.

WO 2017/218335 A1 (Nelson) 21 Dec. 2017 discloses a method for decontaminating water by bubbling a gas through the water to accumulate PFAS contaminants on the bubbles. The plurality of bubbles is allowed to rise, forming a froth at the surface of the water which is collected and treated.

US 2019/0176101 A1 (Phillips et al.) 13 Jun. 2019 similarly discloses apparatus for separating contaminant from groundwater comprising an elongate chamber having an inlet which is arranged in use to admit groundwater into the chamber near a lower first end. A gas sparger located near the first end admits gas into the chamber for inducing groundwater to flow from the first end of the chamber toward a second end upper end, and for producing a froth layer which rises above an interface with the groundwater including a concentrated amount of the substance.

US 2019/0210900 A1 (Ball et al.) 11 Jul. 2019 also discloses a method for the remediation of recalcitrant halogenated substances using particular combinations of reagents to enhance destruction of organic contaminants in the liquid phase and control the rate of aerosol or froth formation relative to the rate of chemical oxidation and/or reduction/transfer.

It is to be understood that, if any prior art information is referred to herein, such reference does not constitute an admission that the information forms part of the common general knowledge in the art, in Australia or any other country.

SUMMARY OF THE DISCLOSURE

PFAS are considered surfactants having a chemical structure comprising a per fluorinated, n-octyl "tail group" and a carboxylate or sulfonate "head group".

The head group can be described as hydrophilic while the fluorocarbon tail is both hydrophobic and lipophobic. The tail group is inert and does not interact strongly with polar or non-polar chemicals. The head functional group is reactive and interacts strongly with polar groups such as water. The fluorinated backbone is both hydrophobic (water repelling) and oleophobic/lipophobic (oil/fat repelling).

There is provided herein a process for PFAS decontamination comprising exposing water comprising PFAS contaminant to gas to accumulate a PFAS concentrate and separating the PFAS concentrate.

The process may involve bubbling the gas through a concentrator having a column of the water to form a water gas interface which attracts the PFAS contaminant, and which forms a froth of PFAS concentrate which is separated.

The water may cascade through a series of interconnected columns to iteratively reduce the PFAS concentration and the water may furthermore be passed through the series of interconnected columns more than once, which was found according to experimentation to be able to reduced 20,000 L of leachate to only 200 L of froth fractionate.

The PFAS separation is enhanced by the addition of a hydrofluorocarbon refrigerant, such as 1,1,1,2 Tetraflouroethane, Difluoromethane or Pentaflouroethane to the gas.

It is believed that with carbon-fluorine bonds of the hydrofluorocarbon refrigerant aid in attracting the carbon fluorine tail of all types of PFAS compounds to the water-gas interface, perhaps via Van Der Waals Forces and can be used for both soil and water PFAS extraction.

The hydrofluorocarbon refrigerant especially aids separation of smaller molecular weight PFAS molecules, including beyond what can be achieved using charged or ionised gases alone, thereby allowing a larger spectrum of PFAS molecules to be extracted from soil or water.

The refrigerant addition was found to significantly increase PFAS extraction, particularly for the non-regulated PFAS compounds. For example, regulated PFAS contaminant extraction was found to increase from 94-98% to 98-100% by the addition of the hydrofluorocarbon refrigerant. Yet further, non-regulated PFAS contaminant extraction was found to increase from 20-60% to 85-98 percent by the addition of the hydrofluorocarbon refrigerant.

Furthermore, percentage volume reduction of contaminated water to PFAS froth fractionate concentrate was found to increase from 1/(400-500) to 1/(10,000-20,000) through the addition of the hydrofluorocarbon refrigerant.

Yet further, the addition of the hydrofluorocarbon refrigerant increases PFAS extraction efficiency and volume reduction of subsequent passes through the concentrator. For example, a volume of 1,000,000 L of PFAS contaminated water was reduced to 10,000 L in a first pass through an experimental multistage concentrator and further reduced to between 2000-4000 L on a second pass through the multistage concentrator.

Gaseous offtake may be compressed to return the hydrofluorocarbon refrigerant to liquid phase for recycling.

A charged or ionised gas may also be used to enhance increase PFAS extraction. A charged or ionised gas exhibits electrical potential or dipoles caused by variations in the electron clouds. It is believed that this electrical potential or these dipoles attract fluorocarbon tail groups of the PFAS at the water gas interface by Van Der Waals forces. For example, air may be charged or be ionized using a gas ionizer such as an ozone generator.

The gas may include ozone in air, ozone in oxygen, oxygen, common air, nitrogen, nitrous oxide, carbon dioxide, water vapour, oxides of nitrogen and chlorine dioxide.

These different gases may be applied to different columns at different stages to target different types of PFAS compounds.

In alternative embodiments, as opposed to bubbling gas through a column of water, scrubbing apparatus comprising a pressurised vessel having the gas therein through which the PFAS contaminated water flows across packing material (which enhances surface area) may be used.

For contaminated soil, a colloidal suspension of contaminated soil and wastewater may be agitated in a vessel having an atmosphere the gas applied thereabove to form the gas water interface at a surface thereof. As such, the PFAS concentrate forms at the surface.

PH adjustment and/or surfactant additions may be used to enhance the intermolecular attraction of certain PFAS compounds such as PFBA.

Collected PFAS concentrate may be decomposed using oxidation. In embodiments, upper portions of the columns of the concentrator may comprise UV lamps acting on ozone to generate hydroxyl free radicals to decompose the PFAS concentrate. Alkalinity may be enhanced, such as to between 10-12 pH to enhance the decomposition.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

A process for PFAS decontamination comprises exposing water comprising PFAS contaminant to gas to accumulate a PFAS concentrate and separating the PFAS concentrate.

Figure 1:
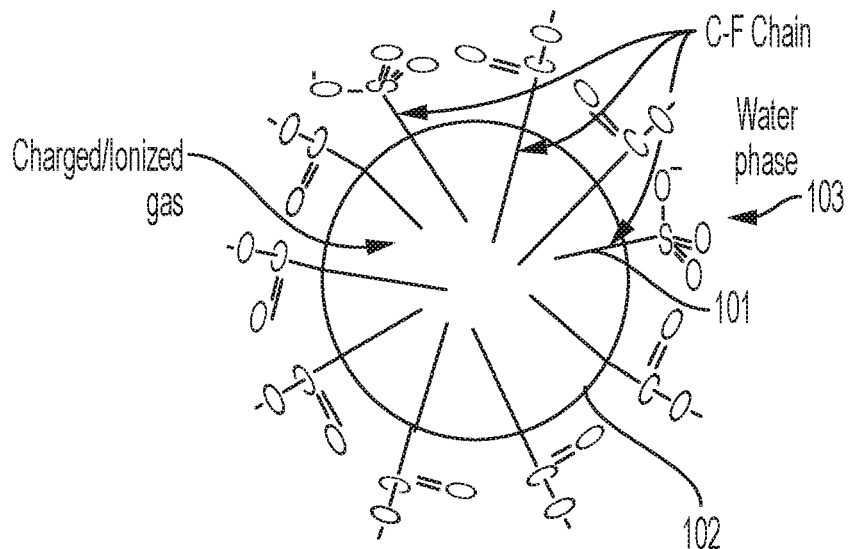
FIG. 1 illustrates attraction of fluorocarbon tail groups of PFAS molecules to a water gas interface formed by a bubble of charged or ionised gas in water.

The gas attracts fluorocarbon tail groups of the PFAS by intermolecular attraction at a water gas interface to form PFAS concentrate. As shown in FIG. 1, the PFAS fluorocarbon tail 101 is attracted to the water gas interface of a gas bubble 102 with the terminal functional group 103 residing in the water. The accumulated PFAS concentrate can then be separated.

Preferably, a gas that exhibits a charge and/or variations in electron densities, or that can be ionised or charged is used. It is believed that Van der Waals forces of ionised or charged gasses further attract the fluorocarbon tail groups of the PFAS to the water gas interface.

The PFAS partitioning behaviour also may be affected by the alkyl chain length and the charge on the terminal functional group. In general, PFAS's with shorter alkyl chain length are more water soluble than those with longer lengths. PFAS compounds with increasing water solubility would be less likely to associate at an air water interface as they may be drawn into the aqueous phase and less likely that the tail of the molecule resides in the gas phase.

Figure 7:
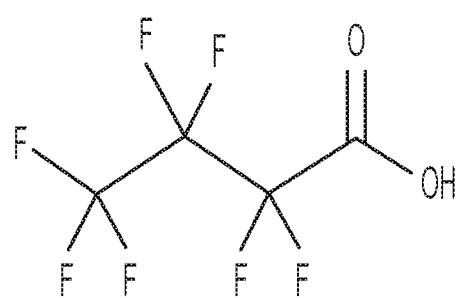
FIG. 7 shows a form of PFAS molecule.

Perfluorobutyrate (PFBA) and other PSAF compounds may be an exception as some compounds can tend to form the configuration shown in FIG. 7, wherein the hydrophilic end of the molecule is bound to the tail making it less likely to have surfactant qualities and associate at the air water interface, making it only miscible in water. In other words, strong bonding between H and F shown by the arrow binds the hydrophobic head group, making it less soluble in water.

As such, pH adjustment and surfactant additions may be added to facilitate attraction of the PFBA fluorocarbon tail groups to the gas water interface. It is believed the pH effect on the polar functional group end of some PFAS molecules aids in the PFAS hydrophilic end to bind to the water phase.

The process may involve bubbling gas through water wherein the PFAS contaminant is attracted to the water gas interface of bubbles which rises to the top to form a froth fractionate of PFAS concentrate.

Figure 2:
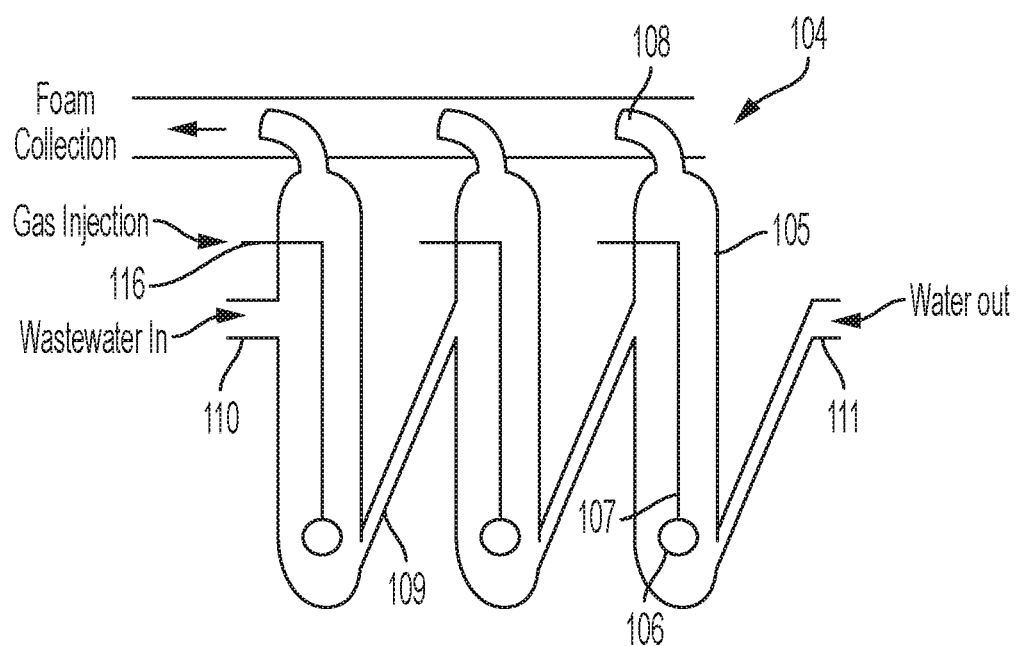
FIG. 2 shows a concentrator in accordance with an embodiment.

In this regard, FIG. 2 shows froth concentrator apparatus 104 which comprises a series of columns 105 comprising PFAS contaminated water therein into which gas from a gas inlet 107 is bubbled through a gas sparge 106 at the bottom of each column 105 to form a water gas interface within each column 105.

The gas interacts with the PFAS contaminated water in the aforedescribed manner to form a froth fractionate which is collected from upper froth fractionate outlets 108. The columns 105 may be arranged in series with interconnecting overflows 109 therebetween. The series of columns 105 may comprise a wastewater inlet 110 and a wastewater outlet 111.

The gas injected may comprise ozone in air, ozone in oxygen, oxygen, common air, nitrogen, nitrous oxide, carbon dioxide, water vapour, oxides of nitrogen and chlorine dioxide.

A hydrofluorocarbon refrigerant is added to the gas. The hydrofluorocarbon refrigerant is generally defined herein as a carbon fluorine compound that is in gas phase at standard temperature and pressure (25° C. and 1 atm) and which is compressible to form a liquid for recovery, including for reuse.

The hydrofluorocarbon refrigerant is preferably 1,1,1,2 Tetraflouroethane but may also include Difluoromethane or Pentaflouroethane.

Different types of gases may be injected into different columns 105 to target specific types of PFAS contaminant or multiple types of PFAS contaminant. For example, common air may be injected into a first column 105 whereas ozone in air (having enhanced PFAS accumulating ability which may be due to the Van der Waals forces as outlines above) may be injected into a second column 105 and air comprising the hydrofluorocarbon refrigerant (having enhanced PFAS accumulating ability by further attracting the carbon fluorine tail of the PFAS molecule as outlined above) may be injected into a third column 105 to target smaller molecular weight PFAS molecules.

Gaseous offtake from the outlets 108 may be collected and compressed to return the hydrofluorocarbon refrigerant to a liquid phase for recycling.

The collected froth fractionate may be decomposed by oxidation. In an embodiment, upper ends of each column 105 may comprise UV lamps acting on ozone (which may be introduced at concentrations from 5-5000 PPM) which generate hydroxyl free radicals to decompose the concentrated PFAS compound.

Alkalinity may be enhanced, such as to between 10-12 pH to enhance the decomposition process.

Figure 3:
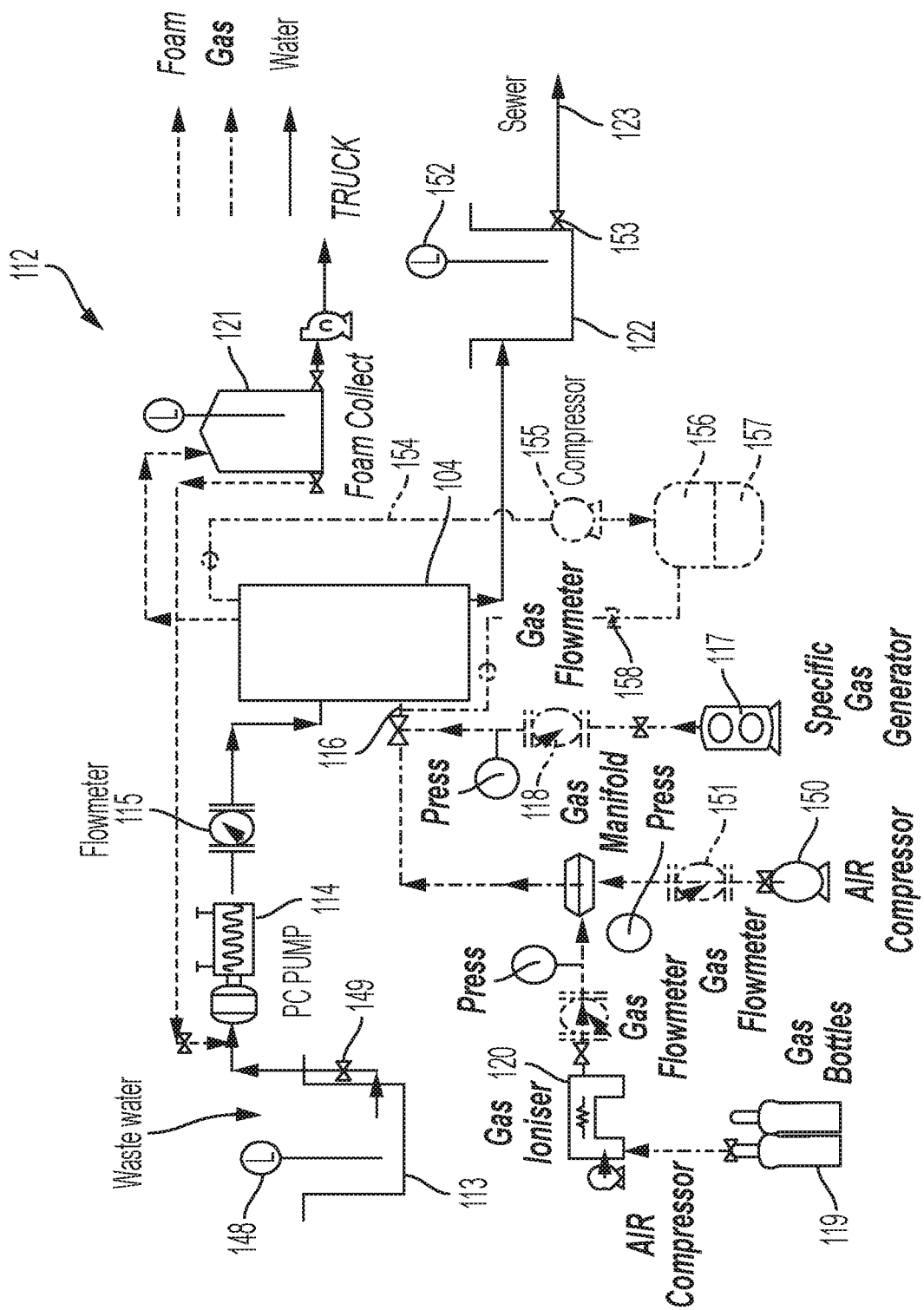
FIG. 3 shows a system for reducing concentration of PFAS contamination in wastewater.

FIG. 3 shows a system 112 for reducing concentration of PFAS contamination in wastewater using the gas bubbling technique.

The system 100 may comprise a wastewater reservoir 113 and a level sensor and outlet control valve 149 controlled accordingly. The reservoir 113 may feed into the concentrator 104 via a pump 114 and flowmeter 115.

Air from an air compressor 150 and measured through a flowmeter 151 may feed into the gas injection inlet 116 of the concentrator 104.

The air may be supplemented with specific gas from a specific gas generator 117 via flowmeter 118. Specific types of gases may include oxygen, nitrogen, nitrous oxide, carbon dioxide, water vapour, oxides of nitrogen and chlorine dioxide contained or generated by the specific gas generator 117.

The air may be further supplemented with charged or ionised gas drawn from gas bottles 119. The gas drawn from the gas bottles 119 may be ionised using a gas ioniser 120.

The collected froth PFAS concentrate may be collected in reservoir 121 and periodically pumped for disposal such as via truck disposal.

The wastewater may flow to a wastewater reservoir 122 with level sensor to control an outlet valve 153 to periodically drain the wastewater to a sewer 123.

Gaseous offtake may be collected via gaseous offtake line 154 which is compressed by a compressor 155 to compress the hydrofluorocarbon refrigerant to a liquid phase 157 which is stored within a liquid refrigerant container 156.

Refrigerant gases may be released via refrigerant control valve 158 back into the gas injection inlet 116.

Test results from passing regulated and non-regulated PFAS contaminant twice through the system of FIG. 3 showing the difference of contamination and volume reduction by using 1,1,1,2 Tetraflouroethane are shown in the following table:

| Key parameter for PFAS Treatment | No hydrofluorocarbon refrigerant added | With hydrofluorocarbon refrigerant Added |
|---|---|---|
| % reduction of regulated PFAS contamination | 94-98% | 98-100% |
| % Reduction non-regulated PFAS contamination | 20-60% | 85-98% |
| % Volume Reduction after 2nd Pass | 1/(400-500) | 1/(10,000-20,000) |

As can be seen, regulated PFAS contaminant extraction was found to increase from 94-98% to 98-100% through the addition of the hydrofluorocarbon refrigerant. Yet further, non-regulated PFAS contaminant extraction was found to increase from 20-60% to 85-98 percent.

Furthermore, the percentage volume reduction of contaminated water to PFAS froth fractionate concentrate was found to increase from 1/(400-500) to 1/(10,000-20,000) through the addition of the hydrofluorocarbon refrigerant.

Figure 5:
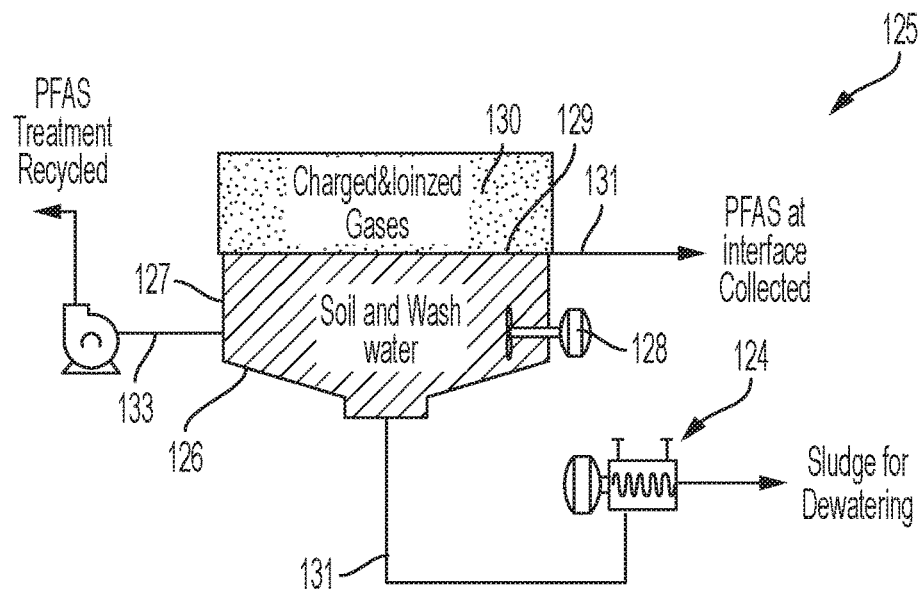
FIG. 5 shows a soil decontamination system in accordance with an embodiment.

FIG. 5 shows a soil decontamination system 125 which comprises a reservoir 126 comprising PFAS contaminated soil colloidally suspended in wash water 127 which is agitated by agitator 128.

A water gas interface 129 is formed by applying an atmosphere 130 of gas comprising the hydrofluorocarbon refrigerant (preferably charged or ionised gas) above the soil and wash water 127. As such, PFAS concentrate is formed at the interface 129 which is removed via collection outlet 131.

In alternative embodiments, the gas may be bubbled through the water and soil suspension.

The soil may form a sludge taken via sludge outlet 131 for dewatering using a dewatering system 124 whereas clean water may be taken via clean water outlet 133.

Figure 4:
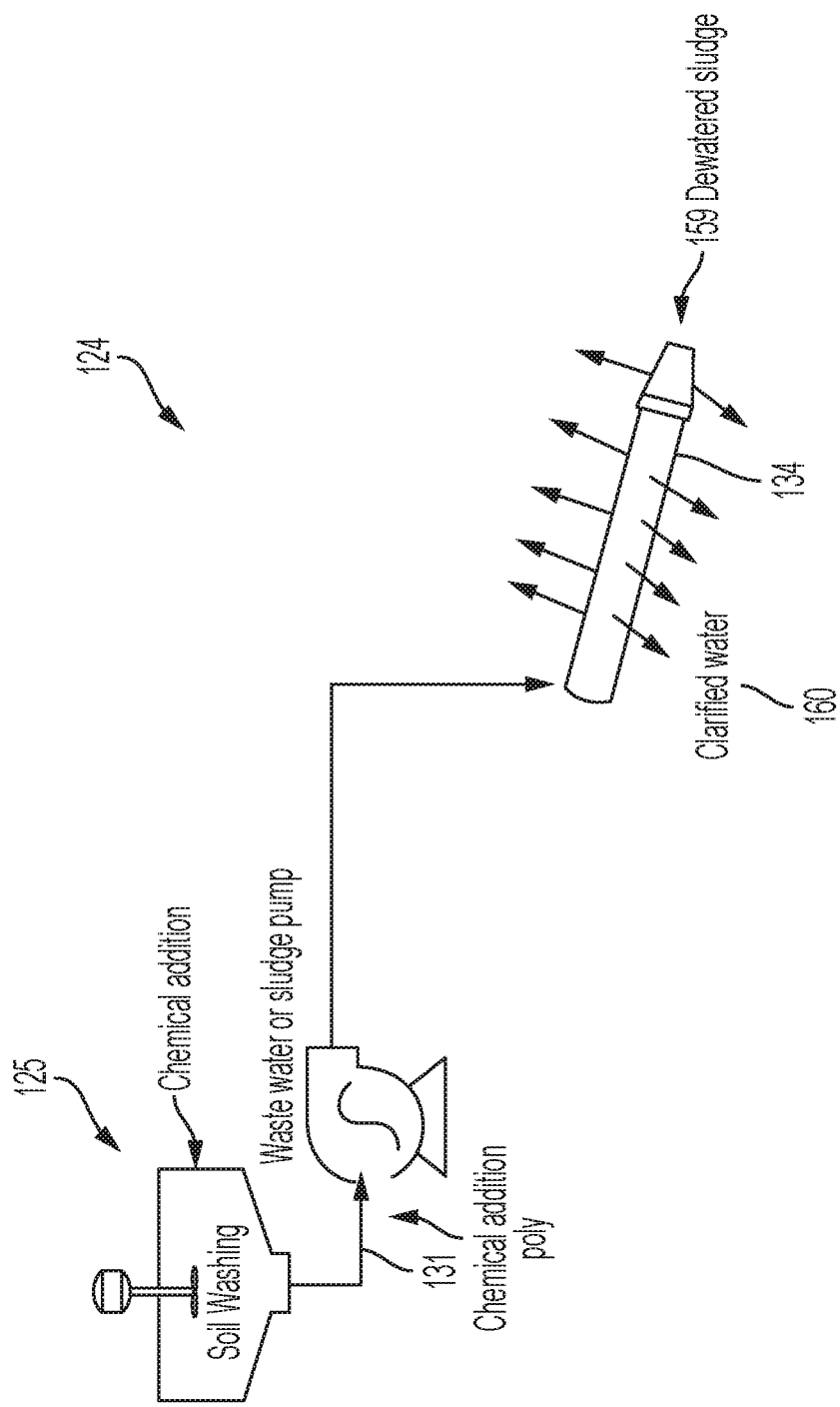
FIG. 4 shows a sludge dewatering system in accordance with an embodiment.

FIG. 4 shows the dewatering system 124 in accordance with an embodiment wherein sludge is pumped through a pressure screen 134 (preferably a 30-300 μm screen) by an auger 135 of a progressive cavity pump to separate the sludge into dewatered sludge 159 and clarified water 160.

Figure 6:
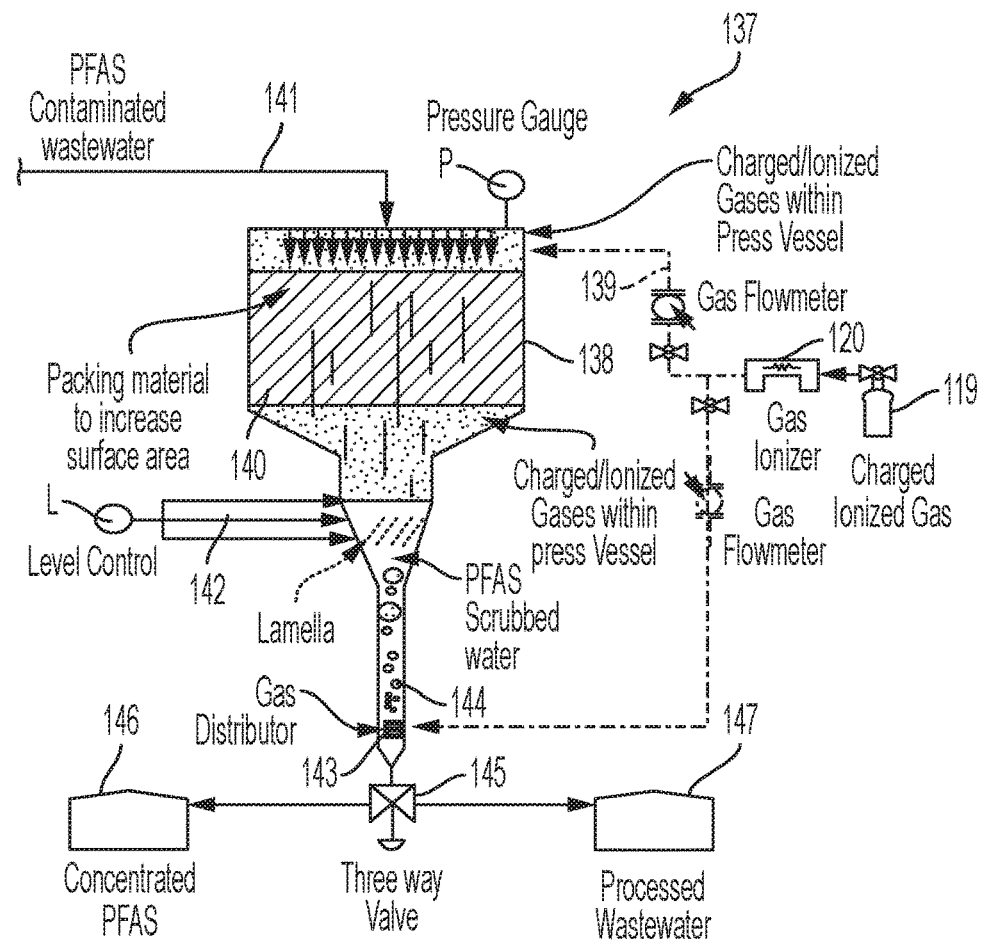
FIG. 6 shows scrubbing apparatus in accordance an embodiment.

FIG. 6 shows PFAS scrubbing equipment 137 which uses gas (preferably charged or ionised gas) comprising the hydrofluorocarbon refrigerant additive to separate PFAS contaminant from wastewater.

The equipment 137 comprises a vessel 138 into which charged or ionised gas is introduced via gas inlet 139. The charged or ionised gas may be provided by the aforedescribed gas ioniser 120.

The vessel 138 comprises corrugated packing material 140 or similar therein to increase surface area within the vessel 138.

The vessel may be pressurised to between 200-300 kPa to increase the concentration of the charged or ionised gas therein to suppress frothing.

PFAS contaminated wastewater is introduced via wastewater inlet 141 which flows over the packing material 140 to expose the wastewater to the charge or ionised gas within the vessel 138 which extracts the PFAS to the water gas interface.

Scrubbed wastewater flows 144 flows to a reservoir of water below the packing material 140. The level of the reservoir of scrubbed water 144 may be monitored by a level sensor 142 which controls the addition of wastewater via the inlet 141.

Charge or ionised gas may also be applied via gas distributor 143 to ensure that the extracted PFAS stays at the water gas interface of the scrubbed wastewater 144.

The scrubbed wastewater 144 may be separated via three-way valve 145 into concentrated PFAS 146 and processed wastewater 147.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A process for PFAS decontamination comprising:
exposing water comprising PFAS contaminant to gas to accumulate a PFAS concentrate; and
separating the PFAS concentrate, wherein the gas comprises a hydrofluorocarbon refrigerant.

2. The process as claimed in claim 1, further comprising:
compressing gaseous offtake to return the hydrofluorocarbon refrigerant to a liquid state; and recycling the hydrofluorocarbon refrigerant for accumulating the PFAS concentrate.

3. The process as claimed in claim 1, wherein the hydrofluorocarbon refrigerant comprises 1,1,1,2 tetraflouroethane.

4. The process as claimed in claim 1, wherein the hydrofluorocarbon refrigerant comprises difluoromethane.

5. The process as claimed in claim 1, wherein the hydrofluorocarbon refrigerant comprises pentaflouroethane.

6. The process as claimed in claim 1, wherein the gas comprises air.

7. The process as claimed in claim 1, further comprising using a gas ionizer to apply a charge to the gas.

8. The process as claimed in claim 1, further comprising adding a pH adjustment agent.

9. The process as claimed in claim 8, wherein the PFAS is PFBA.

10. The process as claimed in claim 1, wherein the process involves bubbling the gas through the water so that the PFAS concentrate accumulate on bubbles which rise to the surface to form a PFAS concentrate froth fractionate which is separated.

11. The process as claimed in claim 10, wherein the process comprises using a concentrator comprising at least one column comprising the water through which the gas is bubbled to form the froth fractionate and wherein the froth fractionate is collected from a top of the column.

12. The process as claimed in claim 11, wherein the process comprises processing the water through a series of interconnected concentrators.

13. The process as claimed in claim 12, wherein the process comprises processing the water through the series of interconnected concentrators more than once.

14. The process as claimed in claim 1, wherein, for decontaminating soil, the process comprises processing a colloidal suspension of contaminated soil in a vessel having an atmosphere of the gas to form a gas water interface at a surface of the suspension and wherein the PFAS concentrate is drawn from the surface.

15. The process as claimed in claim 14, wherein decontaminated sludge is drawn from a bottom of the vessel.

16. The process as claimed in claim 1, further comprising decomposing the PFAS concentrate.

17. The process as claimed in claim 16, wherein decomposing the PFAS concentrate comprises oxidation of the PFAS concentrate.

18. The process as claimed in claim 17, wherein oxidation of the PFAS concentrate comprises oxidation the PFAS concentrate using hydroxyl free radicals.

19. The process as claimed in claim 18, wherein the hydroxyl free radicals are generated by exposing ozone to ultraviolet light.

20. The process as claimed in claim 19, wherein the ozone is at concentrations of between 5-5000 PPM.

21. The process as claimed in claim 17, wherein the water is adjusted to be alkaline.

22. The process as claimed in claim 21, wherein alkalinity of the water is adjusted to between 10-12 pH.

23. The process as claimed in claim 19, wherein the process comprises using a concentrator comprising at least one column for the water through which the gas is bubbled to form the froth fractionate and wherein upper ends of the column comprise UV lamps acting on ozone introduced therein to form the hydroxyl free radicals.

24. The process as claimed in claim 1, wherein the process comprises using scrubbing apparatus comprising a pressure vessel comprising a surface area enhancing formation therein across which the water flows and wherein the pressure vessel is pressurised with the gas.

25. The process as claimed in claim 24, wherein the vessel is pressurised to between 200-300 kPa.

* * * * *